Jan. 29, 1963  A. T. HINCKLEY  3,076,050
ELECTRODE STRUCTURES AND PROCESSES FOR UTILIZING THE SAME
Filed May 20, 1959

INVENTOR.
Arthur T. Hinckley
BY Charles J. Elderkin
ATTORNEY

3,076,050
ELECTRODE STRUCTURES AND PROCESSES FOR UTILIZING THE SAME

Arthur T. Hinckley, Niagara Falls, N.Y., assignor to Strategic Material Corporation, New York, N.Y., a corporation of New York
Filed May 20, 1959, Ser. No. 814,496
19 Claims. (Cl. 13—18)

The invention relates to novel electrode structures for use in electrothermic applications and to improved processing techniques based on these structures. More particularly, the invention involves the provision of unique solid-state unit electrodes of a type adapted for use in continuous electrothermic operations such as arc-electric smelting and the like, which are capable of being baked or cured in situ under influence of the environmental conditions normally attendant to their use, that is, baked and finished under actual operating conditions from an initial high-resistance, low-tensile strength so-called "green" composition to a stable, low-resistance, high-strength amorphous or even graphitized composition. Specifically, the invention is directed to the provision of pre-formed, solid carbon electrodes of a self-baking type, and to improved electrothermic processes utilizing the same.

Conventional electrodes of the general class defined are classifiable under two principal categories, namely, the widely used molded or extruded prebaked electrodes and the pasty, self-baking so-called "Soderberg" electrodes. In the manufacture of the former type of electrodes, the pulverized carbonaceous body material, a suitable binding agent such as pitch, and possibly an extrusion additive such as "summer oil," are intimately blended and then either slugged and extruded or molded to form a homogeneous body of relatively low-porosity. The resulting well-shaped green electrodes are then placed in electric or gas-fired baking furnaces for slow conversion into finished electrodes.

The baking action involves, in part, distillation-cracking of the binder, whereby the slowly increasing temperatures (up to 1000–1100° C. for amorphous carbon or 2200–2700° C. for graphitized carbon) successively softens, melts, distills lighter constituents, and ultimately converts the binder into coke serving to bind together the individual particles of the carbonaceous body material. When the baking furnace has reached its final temperature, heating is discontinued and the electrode are permitted to cool slowly in a non-oxidizing atmosphere until they can be removed for cleaning and machining of the end-sections by drilling and threading for connecting nipples.

In essence, the baking cycle applied to the molded or extruded green electrodes in the manner explained above, serves to convert the very high-resistance green composition into a low-resistance material having properties which remain fairly constant over wide temperature variations, and, of course, imparts mechanical strength to the electrode rendering it capable of withstanding the pressure of electrode clamps and similar hard service encountered in use. It will be appreciated, however, that the time, energy and labor expended in baking the green electrodes represents a material proportion of the over-all cost of a finished electrode. For example, the average baking furnace producing amorphous electrodes operates on a cycle of from 2 to 5 days for loading, 12 to 20 days on power for heating, 20 days for cooling, and from 3 to 5 days for unloading and finishing, representing a minimum cycle of 37 days to a maximum of 49 days, whereas the corresponding cycle for graphitizing, averages from a minimum of 25 days to a maximum of 40 days.

The self-baking Soderberg electrodes consist of a metal casing into which a free-flowing pasty mixture of electrode raw materials is fed on a continuous basis from above. The lowermost portion of the electrode is baked by waste heat from the furnace, and once the electrode and its attendant supply hopper is set up in the furnace they are intended for operation during the entire life cycle of the furnace. Due to the fact that the Soderberg electrodes are not pressed or otherwise compacted prior to baking, the granular composition of the dry carbonaceous body materials must be carefully controlled, and a higher content of binder is necessary for the unbaked mixture, as compared with that used in the prebaked electrodes, in order to allow the electrode paste to flow evenly and fill the entire electrode casing. For the same reason, a substantial column of unbaked paste must be carried above the actual working section of the electrode in order to achieve reasonable densities for the final compacted mass. In spite of column heights of the order of 35 feet of liquid paste, however, the densities of the Soderberg electrodes are not equivalent to those of the molded or extruded prebaked types. For example, comparative figures show an apparent density of from 1.56 to 1.6 for the prebaked molded electrodes and approximately 1.45 to 1.50 for the self-compacting Soderberg electrodes, whereas the specific resistance of the molded prebaked units is of the order of 0.0055 ohm per centimeter cube as compared to 0.008 ohm per centimeter cube for the Soderberg electrodes.

Significantly, it is stimated that the cost of the Soderberg electrodes is about eighty percent (80%) of the price of the normal prebaked electrodes. Quite naturally, this price advantage is attributable almost entirely to the added costs incurred in baking or curing the latter electrodes, although the appreciably higher quality and mechanical strength of the molded or extruded prebaked electrodes is considered by many to more than offset the price advantage enjoyed by the self-baking electrodes of the Soderberg type. Thus, apart from the increased initial capital expenditures required to equip a furnace for Soderberg electrode operation, their inferior mechanical properties lead to frequent electrode breakage with consequent shut-down time and carbon contamination of the material undergoing smelting due to the electrode stub entering the melt. Even more serious, however, is the possibility of the entire overhead column of free-flowing paste entering the furnace chamber following an electrode break.

The present invention is based, in part, on the discovery that ordinary unbaked green electrodes of the molded or extruded types can be structurally modified simply and inexpensively to render them self-baking, thereby permitting direct use of the modified green electrodes in normal electric furnace operations and the like. The electrode structures of the invention combine the beneficial mechanical and electrical characteristics imparted to an electrode mass by molding or extruding practices with the desirable economies realized in the Soderberg electrodes through elimination of costly prebaking and finishing operations.

In copending application Serial No. 792,658 filed by Marvin J. Udy on February 11, 1959, there are described and claimed a series of self-baking electrode structures in which an ordinary green electrode mix or composition prepared in accordance with conventional operating procedures is molded directly within a rigid metallic housing serving to impart initial mechanical strength, enhanced conductivity and self-baking properties to the normally high-resistance, structurally-weak green electrode mass. The resulting electrodes are adapted to be subjected to normal operational use for gradual baking and curing to an eventual working composition substantially equivalent to that of conventional prebaked electrodes.

The theory underlying the electrode structures of the aforementioned copending application is based on the observed phenomenon that the actual working tip or arc-end of an electrode is capable of being totally cured or baked to a very efficient composition under action of hot combustion gases liberated in the furnace as well as by the heat generated by the arc itself. On the other hand, the ordinary green electrodes are not suitable for direct use because of the fact that their inherent high-resistance or poor current-carrying capacity and low tensile strength do not permit clamping of the same within the conventional clamps used to supply electrical energy to the arcing tips from a point spaced along the electrodes somewhat above the arcing tips, i.e., outside of the actual heating or smelting zone. Accordingly, normal green electrodes will crack under action of the clamping pressure, usually at right angles to their length if of the molded type or parallel to their length if of the extruded type, whereas the electrical energy supplied to the green electrodes through the electrode clamps will be largely dissipated by heating within the high-resistance mass, and will not accomplish useful heating at the remote arcing tips.

The inventor in said copending application further observed that suitable clamping strength and current-carrying capacity can be imparted to an otherwise green electrode mass by simple preliminary in-place surface or "skin" curing of the same, with total or complete baking and curing of the electrode essential to its proper performance within the arc zone being effected in a gradual manner under influence of the hot furnace gases as successive portions of the electrode mass are slipped through the clamp and closer and closer into arcing prominence. Thus, since the current distribution within even a completely prebaked electrode will tend to be concentrated within peripheral portions of the electrode mass, the inventor, Marvin J. Udy, found that the aforementioned surface curing will serve to provide an adequate supply path for electrical energy consumed at the arcing tip, and also renders the otherwise green electrode mass mechanically strong enough to withstand normal clamping pressure. In essence, therefore, the process and compositions described and claimed in said copending application are predicated on various structural modifications that can be effected with respect to normal green electrodes to provide self-baking solid-state electrode units which are strong enough to render them mechanically resistant to clamping pressure, and at least surface-conductive to current supplied through the electrode clamp.

To the foregoing end, the simplest form of electrode structure described in said copending application consists of an unbaked or green electrode mass of the molded or extruded type customarily formed as the intermediate product in the manufacture of ordinary prebaked electrodes, which is fitted with an outer metallic casing of sheet metal or the like. The metallic casing is perforated along its entire surface for the dual purpose of permitting the hot furnace gases to reach the surface of the green electrode contained therein, and to permit volatile components of the mass to escape during the gradual baking of the electrode, the pressure of which may otherwise burst the casing. In actual operations conducted with unbaked green electrode assemblies of the foregoing type, it is found that the metallic casing imparts sufficient structural strength to the green electrode to withstand firm clamping of the same within the furnace electrode holders, whereas it also serves to increase the general electrical conductivity of the outer surfaces of the unbaked carbon mass such as to facilitate the passage of electric current from the holders to the arcing tips of the electrodes. Thus, in actual practice, sufficient baking of the peripheral surfaces of the green electrode mass will occur under influence of the heated gases from the furnace chamber so as to insure good surface conductivity of the electrode mass prior to slipping of any given section into the electrode holder. As the electrode assembly proceeds beyond the holder or clamp into the furnace chamber, it is gradually baked to the core, and is ultimately presented to the arc zone as a completely cured, compact, homogeneous mass fully equivalent to that obtained by application of standard prebaking practices.

In other embodiments of the invention described in copending application Serial No. 792,658, the ordinary green electrode composition is used alone or in combination with a suitable supporting structure directly within a furnace electrode rig equipped with an inductively- or resistively-heated mantle adapted to effect preliminary surface curing of the green composition prior to its entry into the electrode clamp, with final or total curing or baking of the electrode being effected under action of the furnace environment.

It is the principal object of my invention to provide improved self-baking solid electrode structures of the same general type as those described in the aforementioned copending application. In particular, the present invention involves the provision of unique metal-clad green electrode assemblies which are capable of maintaining their initial mechanical strength, resistance to breakage or slippage and current-carrying capacity in spite of physical or dimensional changes occurring in their carbon cores as these progress from their initial green or uncured form to a fully cured state. Thus, my investigations have demonstrated that extremely precise mixing practices must be observed and select ingredients employed to produce extruded or molded green electrodes which will undergo only negligible shrinkage during curing, and that the elimination of the volatile components from most green carbon compositions which occurs during their in situ baking will almost invariably result in some shrinkage. Accordingly, to avoid the possibility of having a simple metal encased self-baking electrode of the type described in said copending application slip within its casing due to shrinkage encountered as it is cured, it is generally necessary to pin or otherwise support the carbon core in a lateral direction with respect to its casing. While this practice effectively eliminates the possibility of the electrode slipping from its casing into the smelting chamber, the fact remains that any degree of shinkage occurring within the carbon core will serve to impair the electrical conductivity and current carrying capacity of the casing and surface-cured portions of the green electrode mass. That is to say, since the electrode clamp which constitutes the power input to the electrode, contacts only the metallic casing but not the contained carbon core of such self-baking units, shrinkage of the core away from its casing during the gradual baking cycle impairs the current path between the casing and core and may even introduce an air gap between these surfaces. Under such conditions, the efficiency of the over-all electrical supply circuit from the clamp to the arcing tips of the electrodes will be substantially reduced, since the arcing current will be largely concentrated within the metallic casing rather than being uniformly distributed through the casing to the partially cured depths of the carbon core.

The electrode structures or assemblies of the present invention effectively overcome the foregoing disadvantages while substantially simplifying the fabrication of solid self-baking electrodes of the general class described hereinbefore. In addition, the electrodes of my invention are less expensive than the simple metallic-clad units known heretofore, and further serve to promote more intimate access and contact of the hot baking gases against the uncured green carbon mass forming their core, with the realization of correspondingly improved in situ baking action. The unique electrode structures also possess improved mechanical strength as well as enhanced and more stable electrical operating characteristics.

In accordance with my invention, the foregoing objectives are attained by encasing a conventional molded or extruded solid green carbon electrode within a continuous spiral or helix of metal, such that the casing exerts a constant compressive force against the peripheral surface of the electrode. In this manner, the pretensioned helical casing is constantly maintained in firm compressive contact against the carbon electrode even though the green mass may undergo dimensional changes during its curing or baking process. In an alternative embodiment of the foregoing basic inventive concept, a hollow green electrode structure is employed to promote more uniform and faster baking of the carbon core, and is equipped with both internal and external helices under compression and tension, respectively, such that the carbon mass is sandwiched between the helices and thereby maintained mechanically resistant to clamping pressure and other external forces encountered in its use in a conventional furnace rig. In a still further embodiment of my invention, in addition to the normal mechanical and electrical functions contributed by the tensioned casing, the helix is mated in thread-like fashion to the electrode clamp and serves to facilitate gradual feeding of the electrode into the smelting chamber.

It is believed that the foregoing as well as other features and objects of my invention may be best understood by reference to the following detailed description of specific embodiments of the same taken in conjunction with the accompanying drawing, wherein.

Figure 1:
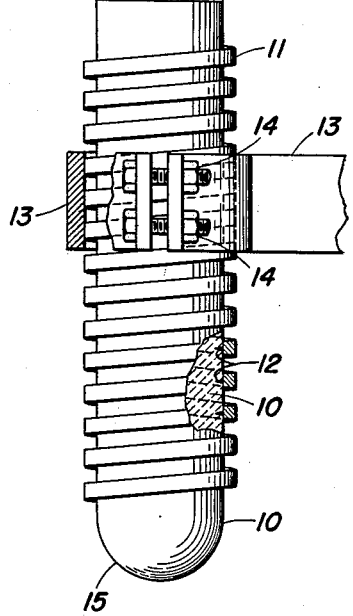
FIG. 1 is an elevational view, partly in section, of a helix-clad green electrode adapted for self-baking when used within a normal furnace electrode mounting rig of the type customarily employed in conjunction with ordinary prebaked electrodes.

With reference to FIG. 1 of the drawing, there is depicted an unbaked or green electrode 10 of the molded or extruded types customarily formed as the intermediate product in the manufacture of ordinary prebaked electrodes. The green electrode is simply fitted with an outer metallic casing 11 in the form of a continuous helix which is suitably tensioned to exert compressive force against the peripheral surfaces of the electrode in contact therewith. The helix 11 may be formed in any cross-sectional configuration, i.e., wire, flat banding, round rodding, hemispherical banding, cubical banding, etc., and may be applied to the green electrode in the form of a prefabricated undersized assembly, or by turning a continuous length of wire, banding or rodding onto the electrode under suitable tensioning conditions. In the latter case, the winding may be applied to the carbon core in a heated state such that it will imbed itself a limited distance into the peripheral surface of the core. As illustrated by the small cut-away section in FIG. 1, if necessary or desirable for purposes of maintaining the convolutions of the helix in accurate spaced relationship from each other, or for purposes of enhancing thermal and electrical conductivity to the interior portions of the green electrode mass, the casing 11 may be pinned to the green electrode at spaced intervals with inwardly projecting spikes or pins 12. The pins 12 can be applied through the casing 11 after it has been mounted on the electrode, or they may be preformed on the inside face of the casing during its manufacture in accordance with well-known techniques. As explained hereinafter with reference to the electrode assembly illustrated in FIG. 7 of the drawing, the individual convolutions of the helical casing may be positioned in contact with a preceding turn or they may be suitably spaced any distance from an adjacent turn.

Successive lengths of the helix-encased green electrode mass are adapted to be joined together in conventional manner by means of threaded mating nipples, or male and female threaded studs and recesses formed on opposite ends of the electrodes in conventional manner. Preferably, the ends of the helix 11 are terminated by a single continuous turn in one plane such that the banding may be cut to match the terminal end of the helix from a preceding length of electrode, and the two ends joined by in-place butt welding.

In the embodiment of the invention illustrated in FIG. 1, the helically-encased green electrode is adapted to be received within a conventional frictional type electrode clamp 13 provided with the usual adjustment bolts 14 for slipping successive portions of the electrode towards the smelting chamber as the full travel of the hydraulic or mechanical electrode rig is reached. Preferably, the clamp 13 should contact at least three or four turns of the helix 11 when these are spaced from each other in the manner illustrated in FIG. 1 to insure good frictional coupling and electrical contact between the electrode and the holder. The combined green electrode mass 10 and its helical metallic casing 11 are both slipped through the electrode clamps or holders 13, as required, towards the arcing zone of the furnace (tips 15), wherein the metallic casing is simply consumed and enters the melt. In the application of the electrodes of the invention to steel and ferroalloy work, the helical casing 11 is conveniently formed of mild steel, but it will be readily appreciated that it can be formed of any metal or alloy corresponding to the nature of the metallic constituent or constituents undergoing treatment within the furnace.

In actual operations conducted with unbaked green electrode assemblies of the type illustrated in FIG. 1, it is found that the metallic helix 11 imparts sufficient structural strength to the green electrodes 10 to permit firm clamping of the same within the furnace electrode holders 13, whereas it also serves to increase the general electrical conductivity of the outer surfaces of the unbaked mass 10 such as to facilitate the passage of electric current from the holders to the arcing tips 15 of the electrodes. In actual practice, it is found that sufficient baking of the peripheral surfaces of the green electrode mass 10 will occur under influence of the heated gases from the furnace chamber so as to insure good surface conductivity of the electrode mass prior to slipping of any given section into the electrode holder 13. As the electrode assembly proceeds beyond the holder and into the furnace chamber, it is gradually baked to the core, and is ultimately presented to the arc zone as a completely cured, compact, homogeneous mass fully equivalent to that obtained by application of standard prebaking practices. As compared with the electrode structures utilizing a sheet metal type casing, the helical casings of the invention promote much more efficient baking of the green carbon mass owing to the substantially greater surface area of the mass which is exposed to direct action of the hot baking gases. More importantly, however, the tensioned helix 11 will adapt itself readily to dimensional changes in the green electrode mass occurring during its gradual curing, such that the casing is always maintained in perfect mechanical and electrical contact with the carbon core.

In general, I have found that the helical casing 11 should exhibit an initial clamping pressure of the order of from 1 to 10 pounds per square inch against the surface of the green carbon electrodes to achieve the desirable sustained mechanical and electrical characteristics of the electrode assemblies of the invention. This pressure is not at all critical, however, and substantially greater tensioning of the casing turns can be employed without altering the unique functional action contributed by the helix. In the case of the hollow electrode units described hereinafter with reference to FIG. 6 of the drawing, I prefer to tension the internal and external helices substantially equally, such that the expansion forces exerted by the internal helix are approximately equal to the compression forces exerted by the external helix.

Figure 2:
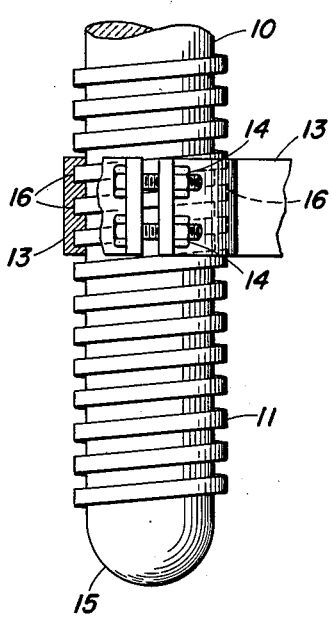
FIG. 2 is an elevational view of a self-baking electrode structure similar to that illustrated in FIG. 1, partly sectioned to show its threaded engagement with a mating furnace electrode clamp.

With reference to FIG. 2 of the drawing, I have shown an electrode structure similar to that illustrated in FIG. 1, wherein the furnace electrode clamp 13 is provided with internal threading 16 adapted to engage the convolutions of a helical casing of the type having the individual turns spaced a regular distance from each other along the green carbon core. In this manner, the clamp 13 may be forced into firm contact against the surface of the carbon core as well as the helical winding therearound, to promote more uniform current distribution and mechanical clamping of the electrode assembly. In addition, the resulting threaded engagement of the electrode and clamp provides a convenient means for slipping the electrode through the clamp by simply turning it after the clamping bolts 14 have been slightly loosened. In utilizing this type of clamp structure, successive lengths of electrode (22 in FIG. 1) can be keyed to insure that a continuous uniform thread will be presented to the clamp as the electrode joints (21 in FIG. 1) pass therethrough, or alternatively, after two lengths of electrode are assembled above the clamp, the clamp may be simply disengaged and repositioned on the new length of electrode at a point above the welded joint of the respective helices. As pointed out hereinbefore, it is always necessary to provide some form of coupling arrangement such as a threaded hole 23 in one end of the electrode into which a mating threaded nipple 21 may be screwed, so that electrodes may be continuously fed into the furnace.

Figure 3:
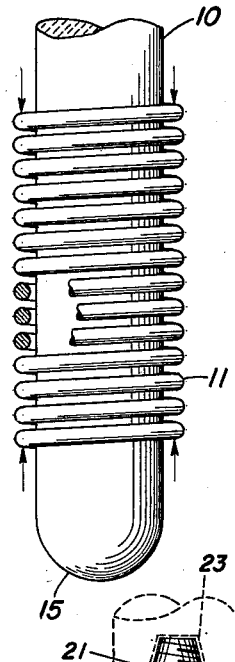
FIGS. 3 and 4 are sequential elevational views of helically-clad self-baking electrodes illustrating one method for mounting the helices in compressive contact against a molded or extruded green electrode unit.
Figure 4:
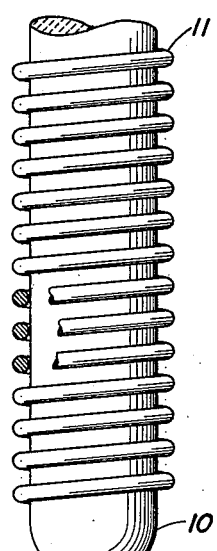

In FIGS. 3 and 4 of the drawings, I have illustrated the technique adapted to position a prefabricated resilient helix 11 around a green electrode structure 10. Thus, the helix 11 is formed with its convolutions slightly undersized as compared with the diameter of the electrode. The undersized helix is then temporarily expanded (FIG. 3) by compressing its ends together sufficiently to permit insertion of the molded or extruded electrode within its turns, and after the electrode is centrally positioned within the expanded helix, the turns are permitted to return towards their normal diameter by relieving the forces indicated by the small arrows in FIG. 3. In this manner, the undersized, resilient turns of the helix will firmly engage the green electrode in compressive contact therewith as illustrated in FIG. 4, to complete the electrode assembly.

Figure 5:
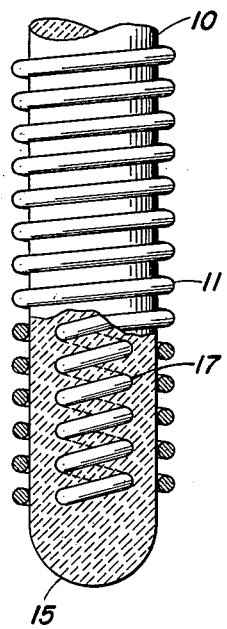
FIG. 5 is an elevational view of an electrode assembly of the invention partly sectioned to illustrate a core-helix positioned within the green electrode mass during molding or extrusion of the same for purposes of improving its mechanical strength prior to in situ curing thereof.

In FIG. 5 of the drawing, I have illustrated a form of helix-clad electrode structure equivalent to that previously described with reference to FIGS. 1-4, that further includes a centrally-disposed internal helix 17 which is positioned within the green electrode mass 10 during the molding or extruding operation for purposes of enhancing the mechanical strength and general resistance to breakage of the electrode. As will be readily appreciated, the internal support for electrode assemblies of this type may take a variety of different forms, and the helix 17 has been depicted for purposes of illustration only. Quite naturally, a helix or other supporting structure incorporated directly within the green electrode mass in this manner is not tensioned or otherwise caused to exert any action other than simple support for the carbon core.

Figure 6:
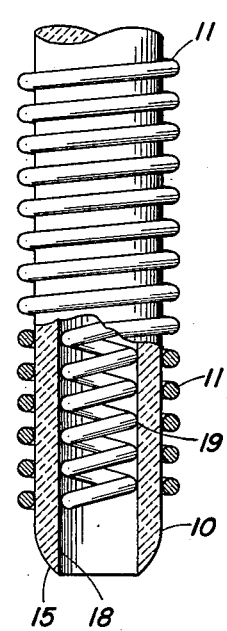
FIG. 6 is an elevational view, partly in section, of a hollow green electrode unit fitted with internal and external helices in the manner explained hereinbefore.

In FIG. 6 of the drawing, I have shown a type of self-baking electrode structure which includes a tensioned external metallic helix 11 equivalent to that previously described in connection with the remaining electrode assemblies of my invention. The structure of FIG. 6 is modified, however, by the provision of a hollow core 18 within the molded or extruded electrode mass 10, which is fitted with a resilient metallic helix 19 exerting uniform expansion forces outwardly against the internal bore of the carbon mass in opposition to the forces exerted by the external helix 11. The internal helix 19 may be positioned within the hollow core of the green electrode by simply elongating the over-all resilient assembly to decrease the mean diameter of the helical convolutions sufficiently to permit insertion of the helix into the core passageway 18. The helix 19 is then permitted to return towards its normal diameter, and will thereby engage the surface of the hollow core 18 in firm expansive contact. Alternatively, if a mild steel wire helix is employed for the internal support in the manner of the external helix of FIG. 7, the hot, flexible wire is simply pressed into the electrode core surface by a heated shoe carried on a winder feed head, thus squeezing sufficient of the heat-softened mix to firmly imbed the helix therein. Preferably, the internal helix 19 is recessed slightly from the end-sections of the tubular carbon electrode to permit conventional machining (not shown) of these ends to receive a hollow mating nipple for joining successive lengths of electrode to each other.

There are numerous advantages inherent in the self-baking electrode structure of FIG. 6. Thus, the combined helices add substantial structural strength to the normally weak green carbon mass, whereas the hollow core type electrode unit is known to effect a savings in carbon consumption both during manufacture and under actual arcing conditions within an electric furnace. In addition, the center core 18 and correspondingly hollow mating nipples provide a passage for hot furnace gases having intimate access to the innermost portions of the green electrode mass, thereby serving to complete baking of the unit in a substantially reduced time.

Figure 7:
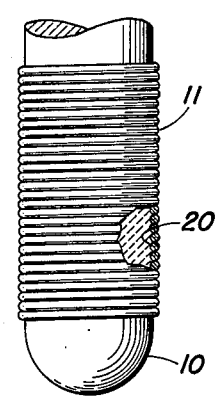
FIG. 7 is an elevational view, partly in section, of an electrode assembly which utilizes a partially imbedded wire helix to impart the requisite mechanical strength and current carrying capacity to a green electrode core.

In FIG. 7 of the drawing I have illustrated a form of electrode assembly which utilizes a relatively small diameter wire winding as the helical casing 11 for the unbaked green electrode core 10. With reference to FIG. 7, the wire casing a mild steel or the like is wound onto the surface of the electrode such that each turn lies in contact with adjacent turns. Preferably, the wire is preheated and tensioned at the time of winding so that each turn will imbed itself into the surface of the electrode for $1/8$ to $1/4$ the diameter of the wire, with the corresponding displaced green mix being squeezed in between the respective turns. In this manner, an overall smooth surface of wire and displaced mix will be available for clamping within the electrode holder. In addition, when the surface of the electrode is heated, both by electric current flowing downwardly through the wire from the electrode clamp to the arcing end of the electrode, and by thermally-conducted heat transmitted upwardly through the sheath of wire, baking of the small ridges 20 of green electrode mix around the imbedded wire takes place very rapidly. It is found that these ridges, when baked, have a very high shear strength and serve to support the electrode mass adequately until baking of the electrode has been completed. Although the adjacent turns of this type of helical casing are in contact with each other, these are line contacts only and readily permit the gases evolved during baking to pass out freely without the development of disruptive pressure. In general, the diameter of the wire winding employed in this type of casing should be suitably proportioned to the diameter of the electrode core. For example, ordinary baling wire is found to be suitable for electrodes of diameters within the range of from 12 to 24 inches, whereas electrodes of from 30 to 40 inches in diameter can be encased within a wire of the order of ⅛ inch diameter.

Having thus described the subject matter of my invention, what it is desired to secure by Letters Patent is:

1. A self-baking carbon electrode that comprises, an elongated dense mass of unbaked solid green carbon electrode mix bound within an external metallic support consisting of a helical winding.

2. A self-baking carbon electrode that comprises, an elongated pressure-molded dense mass of unbaked solid carbonaceous electrode material confined within an external metallic support consisting of a helical winding tensioned to exert continuous compressive force against said mass.

3. A self-baking carbon electrode that comprises, an elongated pressure-extruded dense mass of unbaked solid carbonaceous electrode material confined within an external metallic support consisting of a helical winding tensioned to exert continuous compressive force against said mass.

4. A continuous self-baking carbon electrode that comprises, an elongated dense mass of unbaked solid carbonaceous electrode material including an intimately admixed bonding agent for the same confined within an external metallic support consisting of a helical winding tensioned to exert continuous compressive force against said mass, and means provided at each end of said electrode for coupling the same to additional sections of electrode as a preceding section is consumed within said electric furnace.

5. A continuous self-baking carbon electrode that comprises, an elongated dense mass of unbaked solid carbonaceous electrode material including an intimately admixed bonding agent for the same confined within an external metallic support consisting of a helical winding tensioned to exert continuous compressive force against said mass, the adjacent convolutions of said helical winding being spaced from each other to permit ready access of hot furnace gases to said unbaked carbonaceous mass, and means provided at each end of said electrode for coupling the same to additional sections of electrode as a preceding section is consumed within the electric furnace.

6. A continuous self-baking carbon electrode that comprises, an elongated dense mass of unbaked solid carbonaceous electrode material including an intimately admixed bonding agent for the same confined within an external metallic support consisting of a helical winding tensioned to exert continuous compressive force against said mass, the adjacent convolutions of said helical winding being in contact with each other and each turn being imbedded a limited distance within said mass of electrode material, and means provided at each end of said electrode for coupling the same to an additional section of electrode as a preceding section is consumed within the electrode furnace.

7. A self-baking carbon electrode that comprises, an elongated dense mass of unbaked solid carbonaceous electrode material including an intimately admixed bonding agent for the same confined within an external metallic support consisting of a helical winding tensioned to exert continuous compressive force against said mass, the adjacent convolutions of said helical winding being spaced from each other to permit ready access of hot furnace gases to said unbaked carbonaceous mass.

8. The self-baking carbon electrode as claimed in claim 7, that further comprises a plurality of spiked prongs extending from said helical winding into the interior of said unbaked carbonaceous mass.

9. The self-baking carbon electrode as claimed in claim 7, that further comprises an elongated metallic support molded directly within said unbaked carbonaceous mass.

10. The self-baking carbon electrode as claimed in claim 7, wherein said unbaked carbonaceous mass is pressure-extruded around an internal elongated metallic supporting structure.

11. The self-baking carbon electrode as claimed in claim 7, wherein said unbaked carbonaceous mass comprises a molded hollow tubular configuration, and further comprises an internal metallic helical support positioned within the hollow core of said mass and tensioned into firm contact outwardly against said mass in opposition to the compressive force exerted by said external metallic support.

12. The self-baking carbon electrode as claimed in claim 7, wherein said unbaked carbonaceous mass comprises an extruded hollow tubular configuration, and further comprises an internal metallic helical support positioned within the hollow core of said mass and tensioned into firm contact outwardly against said mass in opposition to the compressive force exerted by said external metallic support.

13. Process for effecting in-place baking and curing of unbaked solid green carbon electrodes of relatively high electrical resistance and low tensile strength during actual electrothermic use of the same that comprises, encasing the electrode within a tensioned helical metallic winding, subjecting said helically-wound electrode while in gradual passage to the side of the electrothermic reaction to the action of heat generated by said electrothermic reaction to effect at least partial surface baking and curing of the same with correspondingly lowered electrical resistance and increased tensile strength of the surface-cured portions of said electrode, passing the partially baked electrode into the electrical circuit of said electrothermic reaction by clamping the metallic helical winding within a current-carrying electrode clamp, and continuing the curing action of said electrothermic heat of reaction on the electrode up to the actual point of consumption of successive portions of said electrode within said reaction.

14. The process as claimed in claim 13, wherein said metallic helical winding is frictionally clamped within said current-carrying electrode clamp.

15. The process as claimed in claim 13, wherein said current-carrying electrode clamp is threaded to receive the convolutions of said metallic helical winding.

16. An electric furnace electrode assembly that comprises, a carbonaceous electrode confined within an arc-consumable external metallic support consisting of a helical winding tensioned into firm compressive contact against said carbonaceous electrode, and a current-carrying electrode clamp constructed and arranged to receive a plurality of the convolutions of said helical winding in thread-like engagement.

17. The electric furnace electrode assembly as claimed in claim 16, wherein said helically-wound carbonaceous electrode is constructed and arranged to be threaded into arcing prominence by turning the same within said electrode clamp.

18. The electric furnace electrode assembly as claimed in claim 16, wherein said carbonaceous electrode consists of an unbaked green carbonaceous mass.

19. The electric furnace electrode assembly as claimed in claim 18, wherein said helical winding is partially imbedded within said unbaked green carbonaceous mass.

References Cited in the file of this patent

UNITED STATES PATENTS

| | | |
|---|---|---|
| 786,257 | Beebe | Apr. 4, 1905 |
| 1,003,354 | Gibbs | Sept. 12, 1911 |
| 1,440,724 | Soderberd | Jan. 2, 1923 |
| 1,450,725 | Hudson | Apr. 3, 1923 |
| 1,467,060 | Munning | Sept. 4, 1923 |
| 1,613,212 | Westly | Jan. 4, 1927 |
| 2,007,920 | Braselton | July 9, 1935 |
| 2,007,926 | Braselton | July 9, 1935 |
| 2,303,515 | Toepfer | Dec. 1, 1942 |
| 2,603,669 | Chappell | July 15, 1952 |
| 2,876,209 | Tommelstad | Mar. 13, 1959 |